(12) United States Patent
Yamashita et al.

(10) Patent No.: US 7,557,459 B2
(45) Date of Patent: Jul. 7, 2009

(54) IN-VEHICLE ELECTRONIC CONTROL DEVICE

(75) Inventors: Manabu Yamashita, Tokyo (JP); Kohji Hashimoto, Tokyo (JP); Yuki Iwagami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 397 days.

(21) Appl. No.: 11/350,783

(22) Filed: Feb. 10, 2006

(65) Prior Publication Data
US 2007/0013231 A1    Jan. 18, 2007

(30) Foreign Application Priority Data
Jul. 15, 2005    (JP) .......................... P2005-206945

(51) Int. Cl.
*B60L 1/00* (2006.01)
(52) U.S. Cl. ...................................................... 307/9.1
(58) Field of Classification Search ................. None
See application file for complete search history.

(56) References Cited
U.S. PATENT DOCUMENTS

| | | | | |
|---|---|---|---|---|
| 6,131,073 A | * | 10/2000 | Honda et al. | 702/107 |
| 6,137,280 A | * | 10/2000 | Ackermann et al. | 323/354 |
| 6,184,649 B1 | * | 2/2001 | Phlipot | 320/100 |
| 7,330,105 B2 | * | 2/2008 | Chew et al. | 340/455 |
| 2007/0016337 A1 | * | 1/2007 | Iwagami et al. | 701/1 |

FOREIGN PATENT DOCUMENTS

| | | |
|---|---|---|
| JP | 09-297623 A | 11/1997 |
| JP | 2002-366238 A | 12/2002 |

* cited by examiner

*Primary Examiner*—Stephen W Jackson
*Assistant Examiner*—Adi Amrany
(74) *Attorney, Agent, or Firm*—Sughrue Mion, PLLC

(57) ABSTRACT

The constant voltage power source circuit which generates a predetermined constant voltage output Vcc by the use of power supplied from an in-vehicle battery via a power switch has a power transistor and an output voltage adjustment circuit. The output voltage adjustment circuit has a reference voltage generation circuit, a comparison amplification circuit, a resistance circuit network, and a nonvolatile second data memory selecting any of a plurality of on/off elements provided in the resistance circuit network and producing electric continuity of the selected on/off element. The constant voltage output Vcc is measured by an externally connected high accuracy voltmeter in the dispatch adjustment stage to be read out and stored via a serially connected external tool. Output voltage correction data are stored in the second data memory in such a manner as to set the external measurement voltage as a target voltage.

10 Claims, 8 Drawing Sheets

IN-VEHICLE ELECTRONIC CONTROL DEVICE

BACKGROUND OF THE INVENTION

1. Field of the Invention

This invention relates to an in-vehicle electronic control device which is a constant voltage control device built into an in-vehicle electronic control device such as an engine control device and a transmission control device, the in-vehicle electronic control device being so improved as to reduce a fluctuation error in output voltage of a constant voltage control circuit generating a predetermined constant voltage output by the use of power supplied from an in-vehicle battery.

2. Description of the Related Art

In the in-vehicle electronic control device, it is important to enhance a constant voltage control accuracy of the built-in constant voltage power source circuit in view of, for example, improvement in AD conversion accuracy in a multi-channel AD converter and improvements in generation accuracy of various comparison reference voltages.

However, though an individual fluctuation of each component parts is inevitable, an expensive constant voltage power source circuit will undesirably be required for obtaining a very high accuracy constant voltage output.

In order to avoid such problem, the constant voltage control accuracy has been improved by using a constant voltage power source device having a constant voltage control accuracy lower than an expectation value and adding an auxiliary unit for correcting a reduction in constant voltage control accuracy.

For instance, Patent Document 1: Japanese Patent Publication 2002-366238 "Circuit Device and method for Setting Adjustment Data of Circuit Device" (refer to paragraph [0009] and FIG. 5) describes that in a constant voltage generation circuit included in a semiconductor sensor or an engine control unit (ECU) for a vehicle, a reference voltage VBGR which is an output voltage of a reference voltage generation circuit having a band gap regulator is amplified by an operational amplifier to obtain a predetermined constant voltage output Vcc, and, at the same time, a predetermined constant voltage output Vcc is obtained by writing adjustment data to an EPROM memory in order to correct an individual fluctuation in reference voltage VBGR and by changing a gain of the operational amplifier by the adjustment data.

In the invention disclosed in Patent Document 1, functions not only improving the constant voltage control accuracy but also adjusting a threshold value of a reset circuit in tandem with the adjustment data are added to the unit.

Also, Patent Document 2: Japanese Patent Publication 09-297623 "Voltage/Current Regulator Circuit" (refer to FIG. 3 and Abstract) describes that a resistance circuit network deciding a resistance value by the use of ROM data is included as a resistance circuit for deciding a differential amplification ratio in a constant voltage regulator circuit which is used for a temperature compensation oscillator, for example, and outputs signals subjected to differential amplification between a reference voltage source and a detected voltage, and fine regulation of a stabilized voltage is achieved by the use of the ROM data.

SUMMARY OF THE INVENTION

(1) Description of Problems in Prior Art

In each of Patent Document 1 and Patent Document 2, a data memory for variably setting a synthetic resistance of a resistance circuit network is used. However, no reference is made to a method of writing output voltage correction data in the data memory.

Also, since an abnormality in the constant voltage power source circuit involves the risk of damaging other circuit components, it is necessary to take all possible measures to avoid reliability to be degraded by adding a circuit component even when the addition of component contributes to improvements in constant voltage control accuracy.

(2) Description of Object of the Invention

An object of this invention is to provide an in-vehicle electronic control device provided with an inexpensive constant voltage power source circuit capable of ensuring a highly accurate output voltage in cooperation with a simple product inspection equipment.

Another object of this invention is to provide an in-vehicle electronic control device capable of preventing degradation in reliability with respect to an abnormality in circuit component added for the purpose of improving an output voltage accuracy.

An in-vehicle electronic control device according to this invention comprising: a microprocessor having a nonvolatile program memory to which a control program and a control constant transferred thereto and written therein via an external tool are stored; a first nonvolatile data memory in which learned data are stored; and an arithmetic processing RAM memory, wherein the in-vehicle electronic control device further comprises a constant voltage power source circuit, an output voltage adjustment circuit, and a multi-channel AD converter; and the program memory includes a program operated as an external measurement voltage reading out and storing unit, a correction data calculating and transferring unit, and a proofread confirming unit.

The constant voltage power source circuit generates a predetermined constant voltage output Vcc by using power controlled and supplied by an in-vehicle battery via a power transistor to supply power at least to the microprocessor, the multi-channel AD converter, and analog sensor unit connected to the multi-channel AD converter.

The output voltage adjustment circuit comprises a reference voltage generation circuit generating a reference voltage Vs, a comparison amplification circuit comparing a size of a voltage which is in proportion to the output voltage of the power transistor and a size of the reference voltage Vs, a resistance circuit network which is added to at least one of inputs of the comparison amplification circuit and performs fine adjustment of the comparison input voltages, a nonvolatile second data memory selecting any of a plurality of on/off elements and producing electric continuity of the selected on/off element to change a synthetic resistance of the resistance circuit network, so that an electric continuity state of the power transistor is controlled by an output from the comparison amplification circuit and that a negative feedback control on the output voltage is achieved in such a manner as to set the output voltage to the predetermined constant voltage output Vcc which is proportional to the reference voltage Vs.

The multi-channel AD converter generates a maximum digital output of a predetermined resolving power when an analog input voltage of the AD converter is equal to a reference voltage Vref supplied from the constant voltage power source circuit and inputs a digital conversion value for a multiple of analog inputs selectively to the microprocessor.

The external measurement voltage reading out and storing unit measures the output voltage of the constant voltage power source circuit by the use of a high accuracy voltmeter provided outside the in-vehicle electronic control device and transfers the measurement voltage to the RAM memory in the in-vehicle electronic control device via the external tool to temporarily store the measurement voltage in the RAM memory.

The correction data calculating and transferring unit operates when a deviation voltage between the external measurement voltage V0 read out and stored by the external measurement voltage reading out and storing unit and a target value of the output voltage is excessive, to calculate output voltage correction data in response to a value of the deviation voltage and to transfer the output voltage correction data to the second data memory to write the output voltage correction data in the second data memory.

The proofread confirmation unit reads out again an external measurement voltage V10 measured by the high accuracy voltmeter in a state where the output voltage correction data are written in the second data memory to confirm whether or not the deviation between the external measurement voltage V10 and the output voltage target value is corrected to an allowable error range; and the external measurement voltage reading out and storing unit, the correction data calculating and transferring unit, and the proofread confirmation unit are used as a proofread control unit to be operated in an adjustment driving stage of the in-vehicle control device.

According to the in-vehicle electronic control device, since the output voltage of the constant voltage power source circuit is used as the reference voltage of the multi-channel AD converter, high accuracy proofread information is fetched in the dispatch adjustment stage by the use of the high accuracy voltmeter and the external tool externally connected to the in-vehicle electronic control device, and the output voltage correction data for correcting a fluctuation in output voltage is calculated by the use of the microprocessor in the in-vehicle electronic control device to store the output voltage correction data in the nonvolatile second data memory performing fine adjustment of the output voltage even when the in-vehicle electronic control device has a constitution which does not realize detection of the output voltage of the constant voltage power source circuit.

Therefore, the fluctuation in each circuit components is corrected by the use of the output voltage correction data, and, since the output voltage correction data are calculated in the in-vehicle electronic control device, it is possible to simplify dispatch adjustment equipment and to use the external tool standardized for various in-vehicle electronic control devices.

Also, since the correction data is retained in the case where the connection with the in-vehicle battery is interrupted, it is unnecessary to use an external equipment such as the high accuracy voltmeter again once the dispatch adjustment is started, and it is possible to avoid an increase in control burden share of the microprocessor during driving of the in-vehicle electronic control device.

DETAILED DESCRIPTION OF THE INVENTION

First Embodiment (1) Detailed Description of First Embodiment

Hereinafter, description will be given with reference to FIG. 1 of a block diagram showing an in-vehicle electronic control device as a whole according to a first embodiment of this invention.

Figure 1:
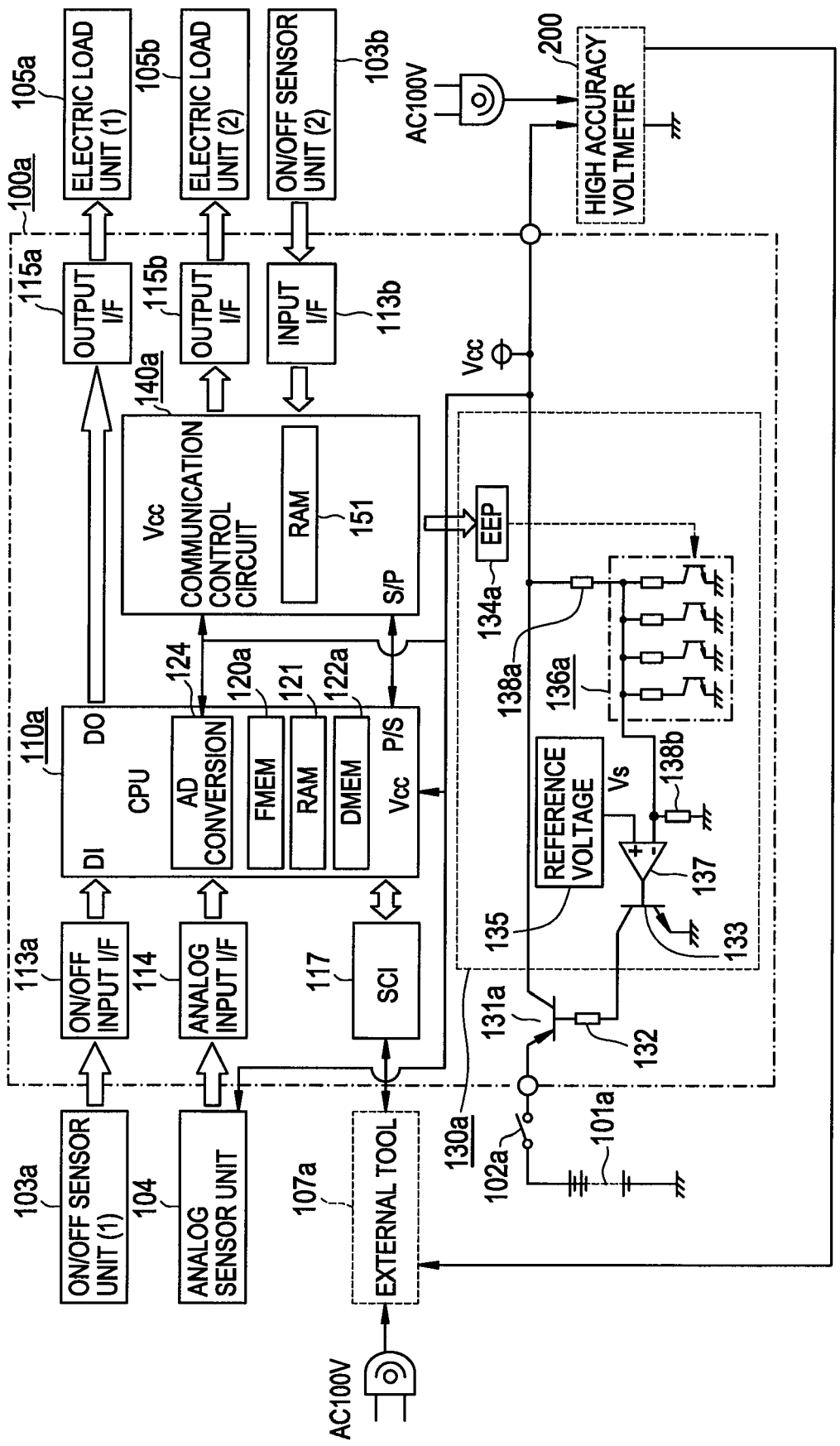
FIG. 1 is a block diagram showing an in-vehicle electronic control device as a whole according to a first embodiment of this invention.

Referring to FIG. 1, an in-vehicle electronic control device 100a is mounted on an electronic substrate housed in a closed housing (not shown) and connected to an external input/output unit described later in this specification via a detachable connector (not shown).

An in-vehicle battery 101a generates a direct current voltage of 12 V, for example, to supply power to the in-vehicle electronic device 100a via a power switch 102a such as a key switch and the like.

An on/off sensor unit 103a is an on/off switch unit performing relatively high frequency operations, such as an engine revolution sensor, a clank angle sensor, and a vehicle speed sensor, and an on/off sensor unit 103b is a on/off switch unit performing relatively low frequency operations, such as a shift switch operating responsive to a selected position of a shift lever for transmission and a pedal switch for detecting a reset state of an accelerator pedal.

An analog sensor unit 104 includes an accelerator position sensor for detecting a degree of a pressure on the accelerator pedal, a throttle position sensor, an air flow sensor of an admission throttle valve, a cooling water temperature sensor, a hydraulic pressure sensor for transmission, an analog sensor of a oil temperature sensor, and the like.

An electric load unit 105a is an electric load performing relatively high frequency operations, such as an engine ignition coil and a driving electromagnetic coil of a fuel injection electromagnetic valve, and an electric load unit 105b is an electric load performing relatively low frequency operations, such as an electromagnetic valve driving electromagnetic coil for controlling a speed of an automatic transmission, and an electromagnetic clutch for driving an air conditioner compressor.

An external tool 107a is a setting/displaying unit to be connected to the in-vehicle electronic control device 100a in the case of a dispatch inspection in a production line of the in-vehicle electronic control device 100a, a dispatch inspection in a car production line, or a maintenance check in branch houses.

Internal constitution of the in-vehicle electronic control device 100a is such that a microprocessor 110a is an integrated circuit element provided with a nonvolatile program memory 120a such as a flash memory, a RAM memory 121 for arithmetic processing, a first data nonvolatile memory 122a, and a multi-channel AD converter 124.

As the data memory 122a, a part of divided regions of the program memory 120a or an EEPROM memory is used.

An input interface circuit 113a is connected between the on/off sensor unit 103a and an input port of the microprocessor 110a and includes a noise filter circuit and a conversion circuit of a signal voltage level.

An input interface circuit 113b is connected between the on/off sensor unit 103b and an input port of a communication control circuit 140a described later in this specification and includes a noise filter circuit and a signal voltage level conversion circuit.

An analog interface circuit 114 is a noise filter circuit connected to an analog input terminal of the multi-channel AD converter 124 via the analog sensor unit 104 and an analog input port of the microprocessor 110a.

An output interface circuit 115a is a power transistor circuit connected between the electric load unit 105a and an output port of the microprocessor 110a, and an output interface circuit 115b is a power transistor circuit connected between the electric load unit 105b and an output port of the communication control circuit 140a described later in this specification.

A constant voltage power source circuit is provided with a power transistor 131a to which power is supplied from an in-vehicle battery 101a and an output voltage adjustment circuit 130a and generates a constant voltage output Vcc of DC 5 V, for example, to supply power to the microprocessor 110a, the multi-channel AD converter 124, or the above-described various input/output interface circuits.

Though the constant voltage output Vcc may be used as the power source for the program memory 120a, the RAM memory 121, and the first data memory 122a, a stabilized voltage of DC 3.3 V, for example, generated by a second constant voltage power source circuit (not shown) is ordinarily used for such purpose, and the output voltage of the second constant voltage power source circuit does not require a highly accurate stabilized voltage.

It is possible to supply power to the RAM memory 121 also from a stabilized voltage of DC 2.7 V, for example, generated by a third constant voltage power source circuit (not shown), and power to the third constant voltage power source circuit is supplied directly from the in-vehicle battery 101a so that contents stored in the RAM memory 121 are retained when the power switch 102a is opened.

A transistor 133 controls an electric continuity state of the power transistor 131a via a base resistance 132 as one of components of the output voltage adjustment circuit 130a.

A second data memory 134a is a nonvolatile memory capable of electrically writing and reading and handles 8 bit data, for example.

A reference voltage generation circuit 135 is a band gap regulator, for example, and generates a reference voltage Vs of 1.25 V when a power source voltage of 2 V or more is supplied thereto.

A resistance circuit network 136a is a plurality of adjustment resistances changing at a rate of 1:2:4:8 and on/off elements serially connected to the adjustment resistances, and the on/off elements are so connected as to open or close in accordance with logical levels of output bits of the second data memory 134a.

An output terminal of a comparison amplification circuit 137 is connected to a base terminal of the transistor 133, so that the reference voltage Vs generated by a reference voltage generation circuit 135 is applied to a non-inverting input terminal and a voltage proportional to an output voltage of the power transistor 131a is applied to an inverting terminal. Voltage divider resistances 138a and 138b are used as reference values for setting a comparison coefficient K of the voltage applied to the non-inverting terminal of the comparison amplification circuit 137.

Since adjustment resistances of the resistance circuit network 136a are parallel connected to the voltage divider resistance 138b, a fine adjustment of the comparison coefficient K is achieved by changing a synthetic resistance of the resistance circuit network 136a.

A communication control circuit 140a is serially connected to a series parallel converter included in the microprocessor 110a and serving as a parent station and, as a child station, includes a series parallel converter performing signal communication, a RAM memory 151, and other logical circuits (not shown) of the RAM memory 151 to transfer output voltage correction data from the microprocessor 110a and to write the data in the second data memory 134a.

The communication control circuit 140a also transmits on/off information from the on/off sensor unit 103b to the microprocessor 110a and on/off controls the electric load unit 105b by an output control signal from the microprocessor 110a.

Among the input interface circuits 113a, 113b, the analog interface circuit 114, and the output interface circuits 115a, 115b, the small size circuit components (except for the heat generating components such as the large size resistance, the power transistor, and the like and the large size condenser) and the serial interface 117 are formed as an integrated circuit element as being integrated with the communication control circuit 140a and the output voltage adjustment circuit 130a, and the communication control circuit 140a transmits monitor input information obtained by the on/off sensor unit 103b to the microprocessor 110a and receives a control output signal generated by the microprocessor 110a to perform drive control of the electric load unit 105b. The overall integrated circuit element (the overall communication control circuit 140a) forms a combined control circuit working in cooperation with the microprocessor 110a.

Hereinafter, description will be given with reference to FIG. 2 which is a block diagram showing a proofread control of the device of FIG. 1.

Figure 2:
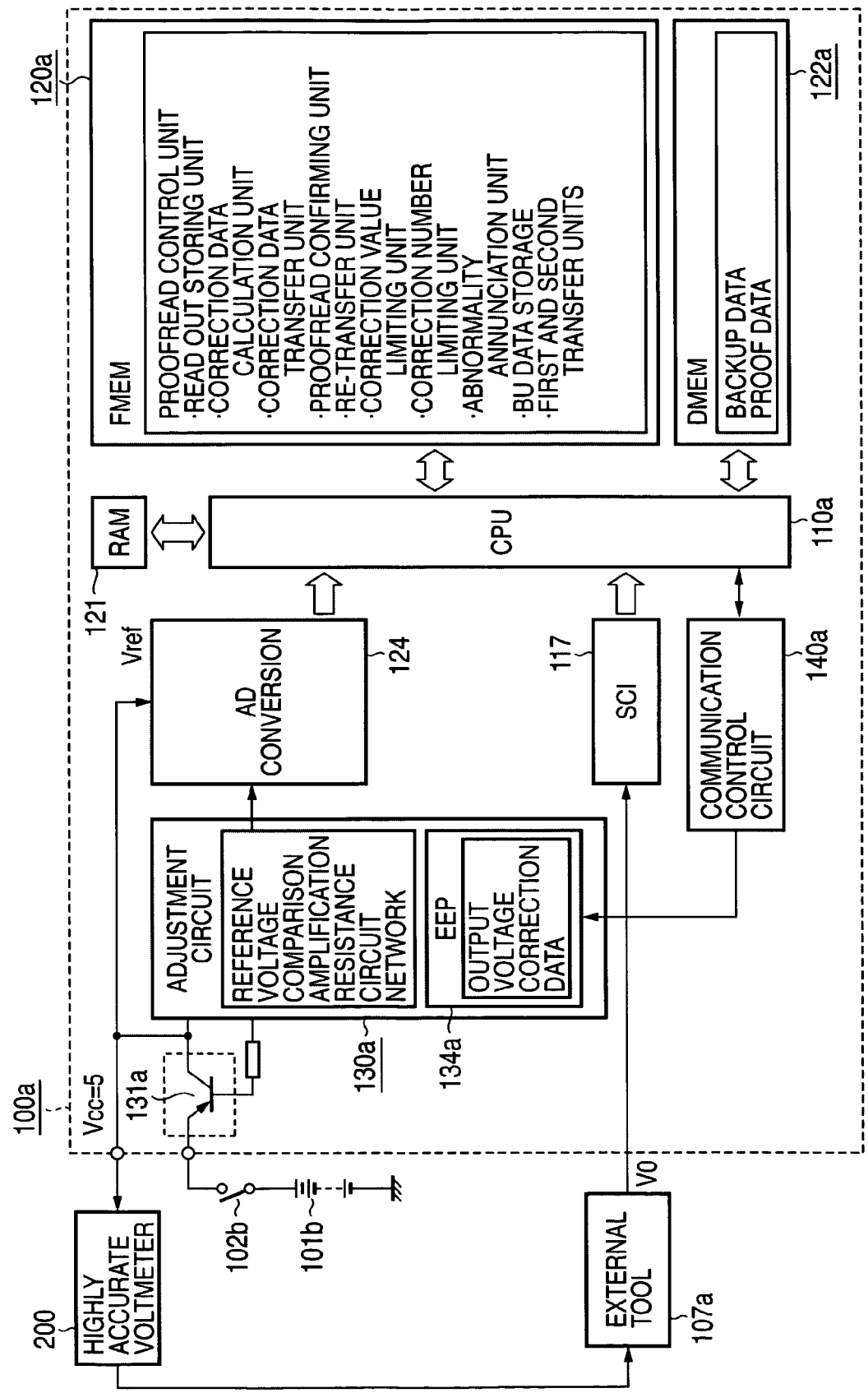
FIG. 2 is a block diagram showing a proofread control of the device of FIG. 1.

Referring to FIG. 2, an external power source 101b equivalent to the in-vehicle battery 101a is an equipment for supplying power to the in-vehicle electronic control device 100a via a power switch 102b when performing an adjustment driving.

A high accuracy voltmeter 200 which is an equipment for adjustment driving measures an output voltage of the power transistor 131a in the in-vehicle electronic control device 100a to transmit a digital value of the measured voltage to the RAM memory 121 via the serial interface 117 and the microprocessor 110a.

As a reference voltage Vref of the multi-channel AD converter 124 working in cooperation with the microprocessor 110a, the constant voltage output Vcc of the constant voltage power source circuit is used as it is.

Therefore, when an input voltage applied to one input terminal of the multi-channel AD converter 124 is Ai, a digital conversion value Di for the input voltage Ai is expressed by the following expressions.

$$Di = (Ai/Vref) \times K = (Ai/Vcc) \times K \qquad (1)$$

$$K = 2^n - 1 \qquad (2)$$

Note that the index number n is a bit number which is a resolving power of the multi-channel AD converter 124. For instance, K is 1023 in the case of 10 bit resolving power.

As is apparent from Expression (1), it is meaningless to digitally convert the content voltage output Vcc by the thus-constituted multi-channel AD converter 124. Even if an AD conversion is performed with the constant voltage output Vcc being connected to one input terminal of the multi-channel AD converter 124, the digitally converted value is always the same irrespective of a change in constant voltage output Vcc.

The nonvolatile memory 120a working in cooperation with the microprocessor 110a includes a program serving as a proofread control unit described later in this specification with reference to FIG. 3 and a program serving as first and second transfer units described in detail with reference to FIG. 4. Though the programs and reference constant data may be stored in the first data memory 122a which is the nonvolatile memory, the first data memory 122a is ordinarily used for mainly handling learning and memory data updated during operation of the in-vehicle electronic control device 100a.

Data identical to output voltage correction data stored as backup data in a second data memory 134a described later in this specification is stored in the first data memory 122a working in cooperation with the microprocessor 110a.

Proof data for judging whether or not there is a mixing/lacking of bit are stored in the first data memory 122a in addition to the backup data, the proof data being inverted logical data obtained by inverting logic of each bit of the backup data, correction data for binary additional value of various data stored in the first data memory 122a, and various proof data corresponding to various check methods.

Figure 3:
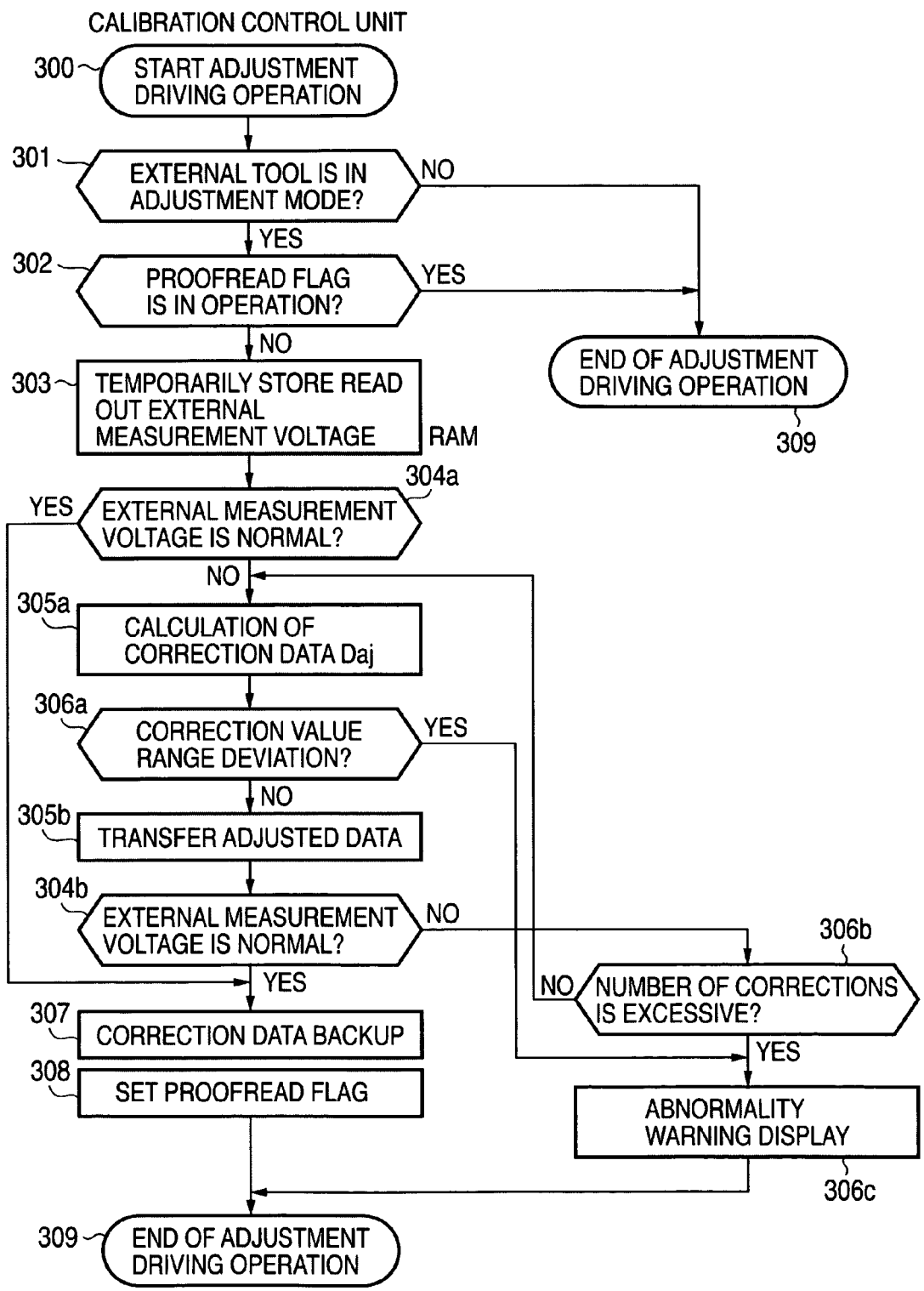
FIG. 3 is a flowchart showing an operation of adjustment driving operation of the device of FIG. 1.

The output voltage correction data are transferred to the second data memory 134a provided in the output voltage adjustment circuit 130a from the microprocessor 110a via the communication control circuit 140a, and the output voltage correction data are calculated by the microprocessor 110a by a process shown in FIG. 3.

(2) Detailed Description of Effect and Operation of First Embodiment

Hereinafter, description will be given with reference to FIG. 3 which is a flowchart of an operation in the proofread control block having the constitution of FIG. 2.

Note that various programs are transferred to the program memory 120a from the external tool 107a by a boot program (not shown) working in cooperation with the microprocessor 110a in advance of the adjustment driving, and the transferred programs includes basic information such as a communication control program, input/output control program, and control constant data and programs to be operated as the proofread control unit and the first and the second transfer units.

Referring to FIG. 3, the microprocessor 110a starts the adjustment driving operation upon close of the power switch 102b in Step 300. In following Step 301, the external tool 107a is connected to judge whether or not an adjustment mode has been set in Step 301, and the process proceeds to an operation termination Step 309 when the mode set in Step 300 is not the adjustment mode or to Step 302 when the mode set in Step 300 is the adjustment mode.

In Step 302, which is a judgment step, it is judged whether or not a proofread flag is set in Step 308, and the process proceed to the operation termination step 309 in the case where the proofread flag has been operated or to Step 303 when the proofread flag has not been operated.

In Step 303, the measurement voltage of the high accuracy voltmeter 200 is read out and temporarily stored in the RAM memory 121 via the external tool 107a. In following Step 304a, which is a judgment step, it is judged whether or not a deviation voltage $\Delta V$ between the external measurement voltage V0 read out and temporarily stored in Step 303 and a true target value of a constant output voltage of DC 5 V, for example, is a normal value equal to or lower than a predetermined threshold value, and the process proceeds to Step 307 when the deviation voltage $\Delta V$ is the normal value or to Step 305a when the deviation voltage $\Delta V$ is not normal.

In Step 305a, which is a calculation step, output voltage correction data (hereinafter referred to as correction value Daj) are calculated for the deviation voltage $\Delta V=(V0-5)$.

In the case where the number of adjustment resistances provided in the resistance circuit network 136a is 6, for example, and a 6 bit correction value Daj is written in the second data memory 134a, a value of the correction value Daj is in the range of 0 to 63, and as design logical values, a correction value Daj=30 is selected when the deviation voltage $\Delta V=(V0-5)$ is 0 V, the synthetic resistance of the resistance circuit network 136a is increased by reducing the correction value Daj when the deviation voltage $\Delta V=(V0-5)$ is increased, and the synthetic resistance of the resistance circuit network 136a is reduced by increasing the correction value Daj when the deviation voltage $\Delta V=(V0-5)$ is reduced, so that a negative feedback voltage to be applied to the inverting input terminal of the comparison amplification circuit 137 is changed.

Since there are fluctuations in resistance values of adjustment resistances in the voltage divider resistances 138a, 138b and the resistance circuit network 136a in practical use, a correction value in accordance with a actual deviation voltage $\Delta V=(V0-5)$ is decided by performing experimental measurements of various products in advance and then calculating an appropriate correction value Daj which is in accordance with the deviation voltage $\Delta V=(V0-5)$ as a statistic score to be stored as a data table in the program memory 120a.

In Step 306a, which is a judgment step performed subsequently to Step 305a, it is judged whether or not the correction value Daj calculated in Step 305a deviates from the appropriate range of 2 to 61, for example, and the process proceeds to Step 306c when there is deviation or to Step 305b when there is no deviation. Thus, a circuit constant is so designed as to prevent the deviation of the correction value Daj from the range of 2 to 61.

In Step 305b, which is a transfer step, the correction value Daj calculated in Step 305a is transferred to the second data memory 134a. In following step 304b, which is a judgment step, it is judged whether or not a deviation voltage $\Delta V$ between the external measurement voltage V10 based on the correction value Daj transferred in Step 305b and a true target value of the constant voltage output Vcc of DC 5 V, for example, is a normal value equal to or lower than a predetermined threshold value, and the process proceeds to Step 307 when the deviation voltage $\Delta V$ is the normal value or to Step 306b when the deviation voltage $\Delta V$ is not normal.

In Step 306b, which is a judgment step, it is judged whether or not the number of corrections in Step 305a has exceeded a predetermined value, and the process returns to Step 305a when the number does not exceed the predetermined value or to Step 306c when the number exceeds the predetermined value. In Step 306c, an abnormality warning/display instruction is sent to the external tool 107a, and then the process proceeds to the operation termination step 309.

Step 307 is performed when the judgments of Steps 304a and 304b are YES and the deviation voltage between the external measurement voltage and the true target value of the constant voltage output Vcc of DC 5 V, for example, is the normal value equal to or lower than the predetermined threshold value, and the correction value Daj sent to the second data memory 134a are ultimately sent to the first data memory 122a as backup data in Step 307.

In Step 308, which is performed subsequently to Step 307, the proofread flag is set to store that the proofread is completed. In following Step 309, the operation start step 300 is activated again after performing execution standby of other control programs of the microprocessor 110a to perform the subsequent steps repeatedly.

To summarize the operation flow of the above-described adjustment driving: Step 303 is an external measurement voltage reading out and storing step; Step 304b is a proofread confirming step; Step 305a is a correction data calculation step; Step 305b is a correction data transfer step; Step 306a is a correction value limiting step; Step 306b is a re-transfer step (correction number limiting step); Step 306c is an abnormality annunciation step; and Step 307 is a backup data storing step.

Hereinafter, description will be made with reference to FIG. 4 which is a flowchart of a driving operation in the in-vehicle electronic control device 100a having the constitution of FIG. 1.

Note that various programs are sent from the external tool 107a to the program memory 120a and connection to the external tool 107a is cut off after performing the adjustment driving of FIG. 3 or the adjustment driving mode is released or changed to a monitor mode by the use of a keyboard in the external tool 107a in advance of the driving operation.

Figure 4:
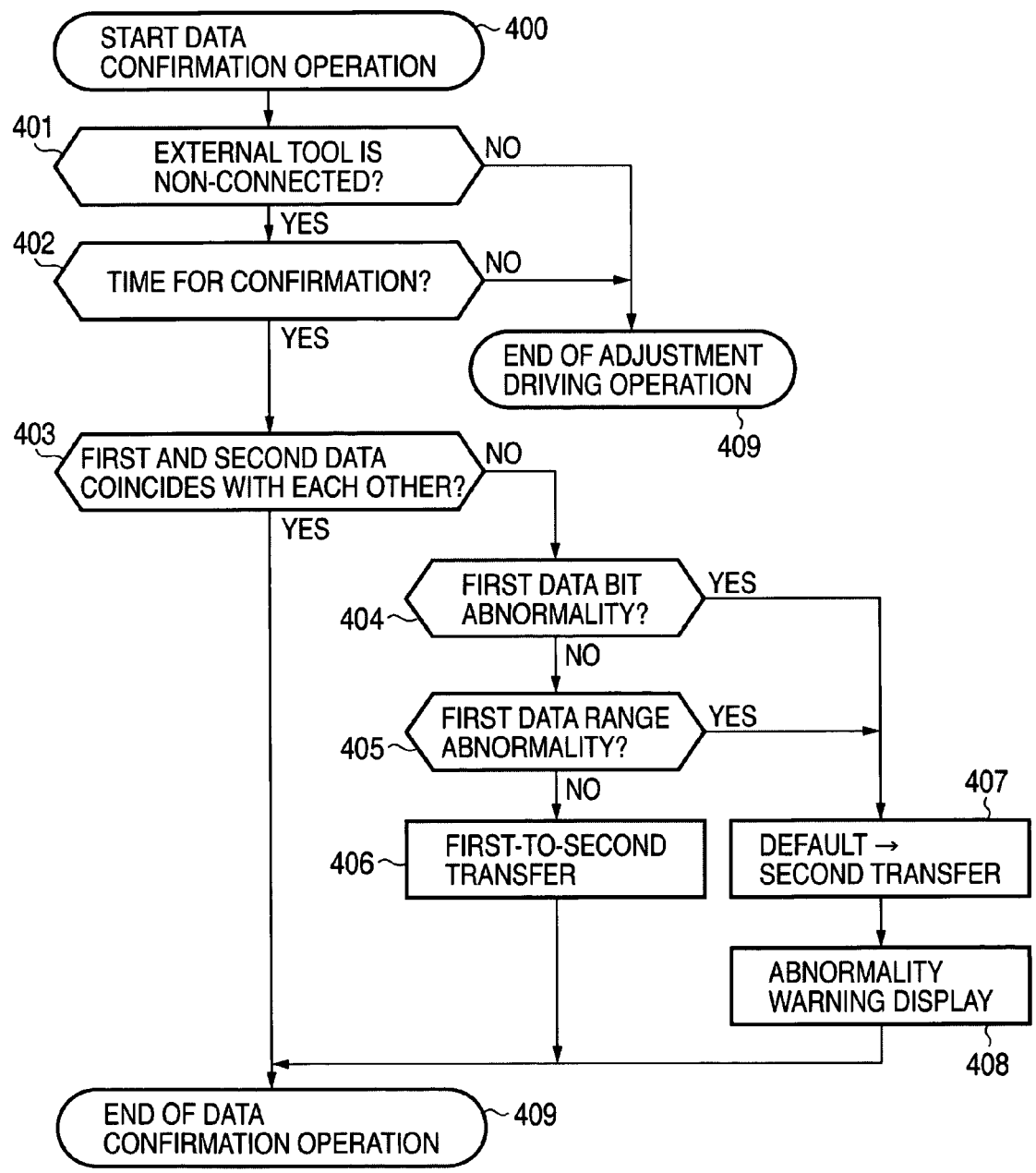
FIG. 4 is a flowchart showing an operation of data confirmation of the device of FIG. 1.

Referring to FIG. 4, the microprocessor 110a starts data confirming operation upon close of the power switch 102a in Step 400 to check whether or not the output voltage correction data stored in the second data memory 134a is normal. In following Step 401, which is a judgment step, it is judged whether or not the external tool 107a is connected or whether or not the external tool 107a in the monitor mode when it is connected, and the process proceeds to an operation termination step 409 when the external tool 107a is connected and is not in the monitor mode or to Step 402 when the external tool 107a is not connected or is connected and in the monitor mode.

In Step 402, which is a judgment step, it is judged whether or not it is data confirmation timing, and the process proceeds to the operation termination step 409 when it is not the data confirmation timing or to Step 403 when it is the data confirmation timing.

Note that the judgment of YES in the confirmation timing judgment in Step 402 is established when the operation is the first time operation performed immediately after the close of the power switch 102a, when a predetermined time has passed after the close of the power switch 102a and the engine revolution speed is in an idling revolution state, or when the engine is stopped due to the open of the power switch and a temporary power supply is performed by a delay interference circuit (not shown) for the in-vehicle electronic control device 100a, and the timing is limited for the purpose of reducing control burden share of the microprocessor 110a in operation.

In Step 403, which is a judgment step, it is judged whether or not the backup data stored in the first data memory 122a in Step 307 coincides with the backup data stored in the second data memory 134a, and the process proceeds to Step 404 when the backup data do not coincide with each other or to Step 409 when the backup data coincide with each other.

In Step 404, which is a judgment step, it is judged whether or not a mixing/lacking of bit information is generated in the first data memory 122a, and the process proceeds to Step 407 when there is a bit abnormality or to Step 405 when there is no bit abnormality.

As the judgment step in Step 404, inverting proof check, sum check, or a check of a combination thereof is performed in accordance with contents of the proof data stored in the first data memory 122a.

In step 405, it is judged whether or not a value of backup data stored in the first data memory 122a is in a normal range of 2 to 61, and the process proceeds to Step 407 when the value is out of the normal range or to Step 406 when the value is in the normal range.

In Step 406, which is a transfer step, the backup data stored in the first data memory 122a is transferred to the second data memory 134a. In Step 407, a predetermined default value of 30, for example, is written in the second data memory 134a. In following Step 408, an abnormality annunciation signal is generated for a warning display unit (not shown) to inform the operator.

In the operation termination step 409 performed subsequently to Steps 406 and 408, the microprocessor 110a performs execution standby of other control operations, and then the operation start step 400 is activated so that the subsequent steps are performed repeatedly.

To summarize the operation flow of the above-described data confirmation: Step 406 is a first transfer step for, in the case where there is a conflict between the backup data value stored in the first data memory 122a and the output voltage correction data stored in the second data memory 134a, transferring the backup data value to the second data memory 134a to rewrite the output voltage correction data.

Likewise, Step 407 is a second transfer step for, in the case where there is a conflict between the backup data value stored in the first data memory 122a and the output voltage correction data stored in the second data memory 134a and the backup data value is an abnormal value, transferring the predetermined default value to the second data memory 134a to rewrite the output voltage correction data.

(3) Description of Constitution and Characteristics of First Embodiment

As is apparent from the foregoing description, the in-vehicle electronic control device 100a according to the first embodiment of this invention is provided with the microprocessor 110a having the nonvolatile programmemory 120a in which the control program and the control constant transferred and written by the external tool 107a are stored, the first data memory 122a, and the arithmetic processing RAM memory 121, and the in-vehicle control device 100a is further provided with the constant power source circuit, the output voltage adjustment circuit 130a, and the multi-channel AD converter 124. The program memory 120a includes programs operated as the external measurement voltage reading out and storing unit 303 and the correction data calculating and transfer units 305a, 305b, and the proofread confirming unit 304b.

The constant voltage power source circuit generates the predetermined constant voltage output Vcc using power supplied and controlled by the in-vehicle battery 101a and the power transistor 131a and supplies power to at least the microprocessor 110a, the multi-channel AD converter 124, and the analog sensor unit 104 connected to the multi-channel AD converter 124.

The output voltage adjustment circuit 130a is provided with the reference voltage generation circuit 135 for generating the reference voltage Vs, the comparison amplification circuit 137 for comparing the sizes of the voltage proportional to the output voltage of the power transistor 131a and the reference voltage Vs, the resistance circuit network 136a which is added to the inverting input of the comparison amplification circuit 137 for performing fine adjustments of the comparison input voltages, and the nonvolatile second data memory 134a for selecting any of the on/off elements used for changing the synthetic resistance values of the resistance circuit network 136a and producing electric continuity of the selected on/off element. The electric continuity state of the power transistor 131a is controlled by the output from the comparison amplification circuit 137, and the output voltage becomes the predetermined constant voltage output Vcc proportional to the reference voltage Vs thanks to the negative feedback control.

The multi-channel AD converter 124 generates a maximum digital output of a predetermined resolving power when the analog input voltage of the AD converter is equal to the reference voltage Vref supplied from the constant voltage power source circuit and inputs digital conversion values for various analog inputs selectively to the microprocessor 110a.

The external measurement voltage reading out and storing unit 303 measures the output voltage of the voltage power source circuit by the use of the high accuracy voltmeter provided outside the in-vehicle electronic control device 100a and transfers the measurement voltage to the RAM memory 121 in the in-vehicle electronic control device 100a via the external tool 107a to temporarily store the measurement voltage in the RAM memory 121.

The correction data calculating and transferring units 305a, 305b operates when a deviation voltage between the external measurement voltage V0 read out and stored by the external measurement voltage reading out and storing unit 303 and the target output voltage value is excessively large to calculate the output voltage correction data Daj in response to the value of the deviation voltage and to transfer the output voltage correction data Daj in the second data memory 134a.

The proofread confirming unit 304b reads out an external measurement voltage V10 again by the use of the high accuracy voltmeter 200 in a state where the output voltage correction data Daj is written in the second data memory 134a to confirm whether or not the deviation between the external measurement voltage V10 and the target output voltage value is corrected to a value in an allowable range. The external measurement voltage reading out and storing unit 303, the correction data calculating and transferring units 305a, 305b, and the proofread confirming unit 304b are used as a proofread control unit operated in the adjustment driving stage of the in-vehicle electronic control device 100a.

The high accuracy voltmeter 200, which is an experimental inspection equipment, has an accuracy equal to or superior to that of a minimum unit of an output voltage that the second data memory 134a can adjust, and a measurement voltage of the high accuracy voltmeter 200 is read out by the external measurement voltage reading out and storing unit 303 as digital data via the external tool 107a to be temporarily stored in the RAM memory 121.

Therefore, it is possible to obtain the high accuracy output voltage correction data Daj based on the digital data having the satisfactory resolving power.

An adjustment range of the output voltages of the resistance circuit network 136a is set to an adjustment band exceeding a maximum fluctuation range of an output voltage based on an individual fluctuation in characteristic value of each circuit components, and the adjustment band is so limited as to keep the output voltage of the constant voltage power source circuit in the vicinity of the predetermined target value irrespective of the data stored in the second data memory 134a.

Therefore, it is possible to perform highly accurate correction even when the output voltage correction data Daj is of a low bit number, and the fluctuation in output voltage will not be excessively large or small even if abnormality occurs in contents of the second data memory 134a, thereby avoiding a serious failure such as a damage on the load components.

The proofread confirming unit which is a part of the proofread control unit, is provided with a re-transfer unit 306b, at least one of control units of the correction value limiting unit 306a and the correction number limiting unit, and the abnormality annunciation unit 306c.

The re-transfer unit 306b operates when the target deviation of the proofread confirming unit 304b is excessively large, and calculates the output voltage correction data Daj again in response to the deviation between the external measurement voltage V10 updated, read out, and temporarily stored by the external measurement voltage reading out and storing unit 303 and the target output voltage to transfer the newly calculated output voltage correction data Daj to the second data memory 134a to rewrite the output voltage correction data Daj in the second data memory 134a.

The correction value limiting unit 306a stops the proofread operation when the correction value ΔV calculated by the correction data calculation unit 305a deviates from a predetermined allowable range.

The correction number limiting unit stops the proofread operation when the deviation between the external measurement voltage V10 and the target output voltage is not corrected to an allowable error range despite the number of the correction calculations and updates/transfers by the re-transfer unit 306b has exceeded the predetermined value.

The abnormality annunciation unit 306c operates when the correction value limiting unit 306a or the correction number limiting unit stops the proofread operation to warn and display a proofread impossible state using the external tool 107a.

Therefore, it is possible to detect and eliminate a product which cannot be adjusted to the normal value in the dispatch adjustment stage.

The program memory is further provided with a backup data storage 307 and first and second transfer units 406,407.

The backup data storage 307 writes the output voltage correction data Daj transferred to the second data memory 134a also in the first data memory 122a as backup data in the adjustment driving stage.

The first transfer unit 406 operates when the output voltage correction data Daj stored to the second data memory 134a does not coincides with the backup data stored in the first data memory 122a to transfer the backup data to the second data memory 134a when the bit proof result relating to the first data memory 122a is normal and the backup data are in the predetermined allowable range.

The second transfer unit 407 operates when the output voltage correction data Daj stored in the second data memory 134a does not coincides with the backup data stored in the first data memory 122a to transfer the predetermined default value to the second data memory 134a when the bit proof result relating to the first data memory 122a is abnormal or the backup data are out of the predetermined allowable range. The first and the second transfer units 406, 407 is operated immediately after power input, before power interruption, or at an appropriate timing in an actual driving stage of the in-vehicle electronic control device 100a, and the bit proof such as a sum check and an inverting proof check is performed for judging whether or not there is mixing/lacking of bit information.

Therefore, though an abnormality occurs in the storage state of the output voltage correction data Daj, it is possible to perform restoration by using the backup data, and it is possible to switch to a safe output voltage even when the backup data is abnormal.

Second Embodiment

(1) Detailed Description of Second Embodiment

Hereinafter, description will be made with reference to FIG. 5 which is a block diagram showing a whole of a second embodiment device of this invention, and differences from the device of FIG. 1 will mainly be described.

Figure 5:
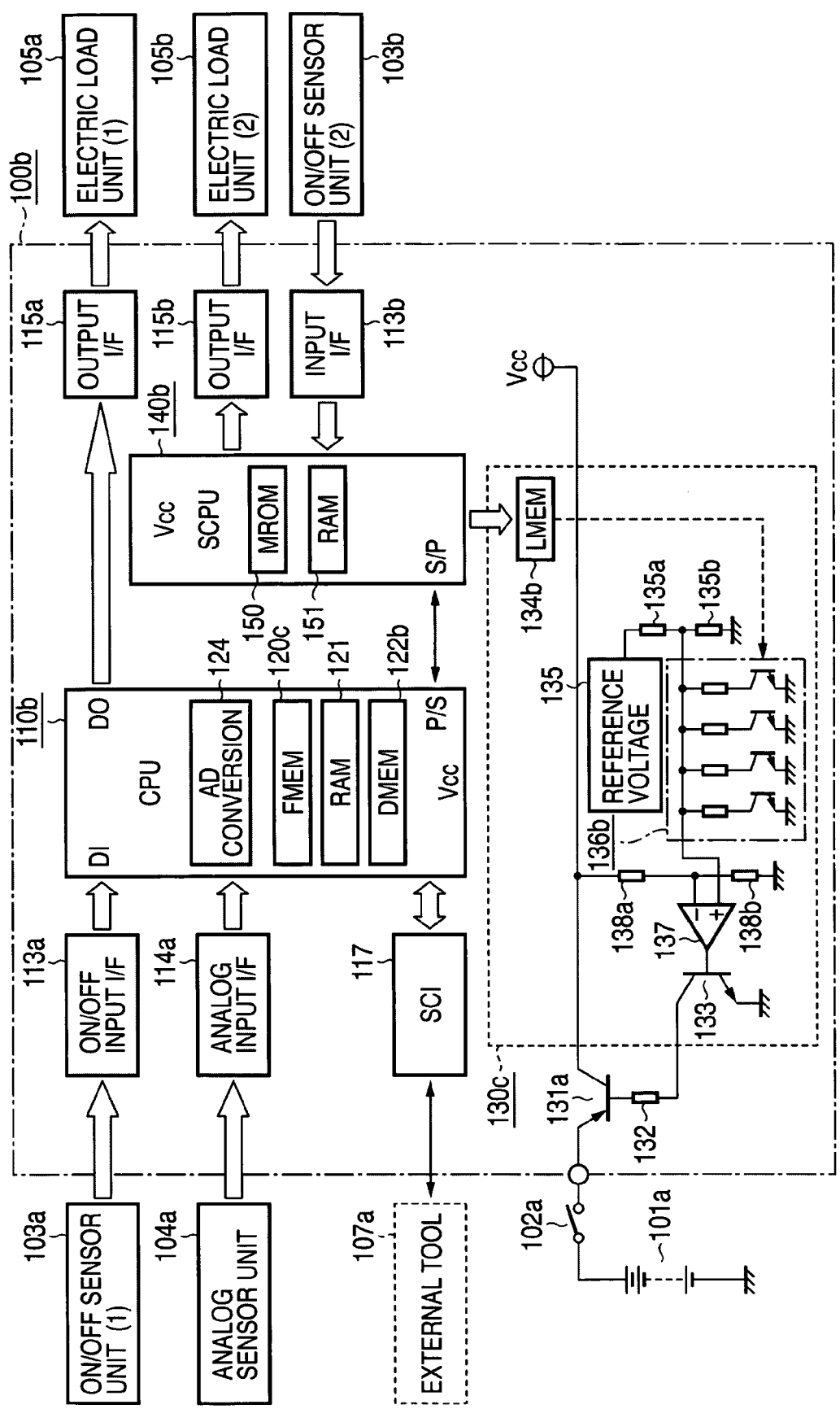
FIG. 5 is a block diagram showing an in-vehicle electronic control device as a whole according to a second embodiment of this invention.

Referring to FIG. 5, power is supplied to an in-vehicle electronic control device 100b from an in-vehicle battery 101a via a power switch 102a, and the vehicle electronic control device 100b controls electric load units 105a, 105b in accordance with an on/off state of off/off sensor units 103a, 103b and a signal level of an analog sensor 104. An external tool 107b serves as a setting and display unit which is connected to the in-vehicle electronic control device 100b in the case of dispatch inspection in a production line of the in-vehicle electronic control device, dispatch inspection in a car production line, or maintenance check in branch houses.

A microprocessor 110b works in cooperation with a nonvolatile program memory 120b, a RAM memory 121, a first nonvolatile data memory 122b, and a multi-channel AD converter 124 to form a main part of a control operation of the in-vehicle electronic control device 10b.

An output voltage adjustment circuit 130b is provided with a resistance circuit network 136b. The resistance circuit network 136b is parallel connected to a voltage divider resistance 135b of the voltage divider resistances 135a, 135b serving to divide an output voltage of a reference voltage generation circuit 135, and the divided voltage is applied to a non-inverting input of a comparison amplification circuit 137.

A voltage in proportion to an output voltage of a power transistor 131a is applied to an inverting input of the comparison amplification circuit 137 serving to control the electric continuity state of the power transistor 131a via a transistor 133, a base resistance 132, and a coefficient of the proportion is decided by voltage divider resistances 138a, 138b.

The resistance circuit network 136b is provided with a plurality of adjustment resistances each having a resistance value of twice that of the adjacent one of resistances, on/off elements serially connected to the adjustment resistances, and electronic continuities of the on/off elements are selectively produced in accordance with a value of an output voltage correction data (hereinafter referred to as correction value Daj) stored in a second data memory 134b which is a nonvolatile memory.

In the case where the number of adjustment resistances provided in the resistance circuit network 136b is 6, for example, and a 6 bit correction value Daj is written in the second data memory 134b, a value of the correction value Daj is in the range of 0 to 63, and as design logical values, a correction value Daj=30 is selected when the deviation voltage $\Delta V=(V0-5)$ is 0 V, the synthetic resistance of the resistance circuit network 136b is reduced by increasing the correction value Daj when the deviation voltage $\Delta V=(V0-5)$ is increased, and the synthetic resistance of the resistance circuit network 136b is increased by reducing the correction value Daj when the deviation voltage $\Delta V=(V0-5)$ is reduced, so that a set voltage to be applied to the inverting input terminal of the comparison amplification circuit 137 is adjusted.

A communication control circuit 140b has an auxiliary microprocessor SCPU as a main body and includes a nonvolatile auxiliary program memory 150 such as a mask ROM memory and an auxiliary RAM memory 151 for arithmetic processing, the communication control circuit 140b being serially connected to the microprocessor 110b via a pair of series parallel converters (not shown).

Figure 7:
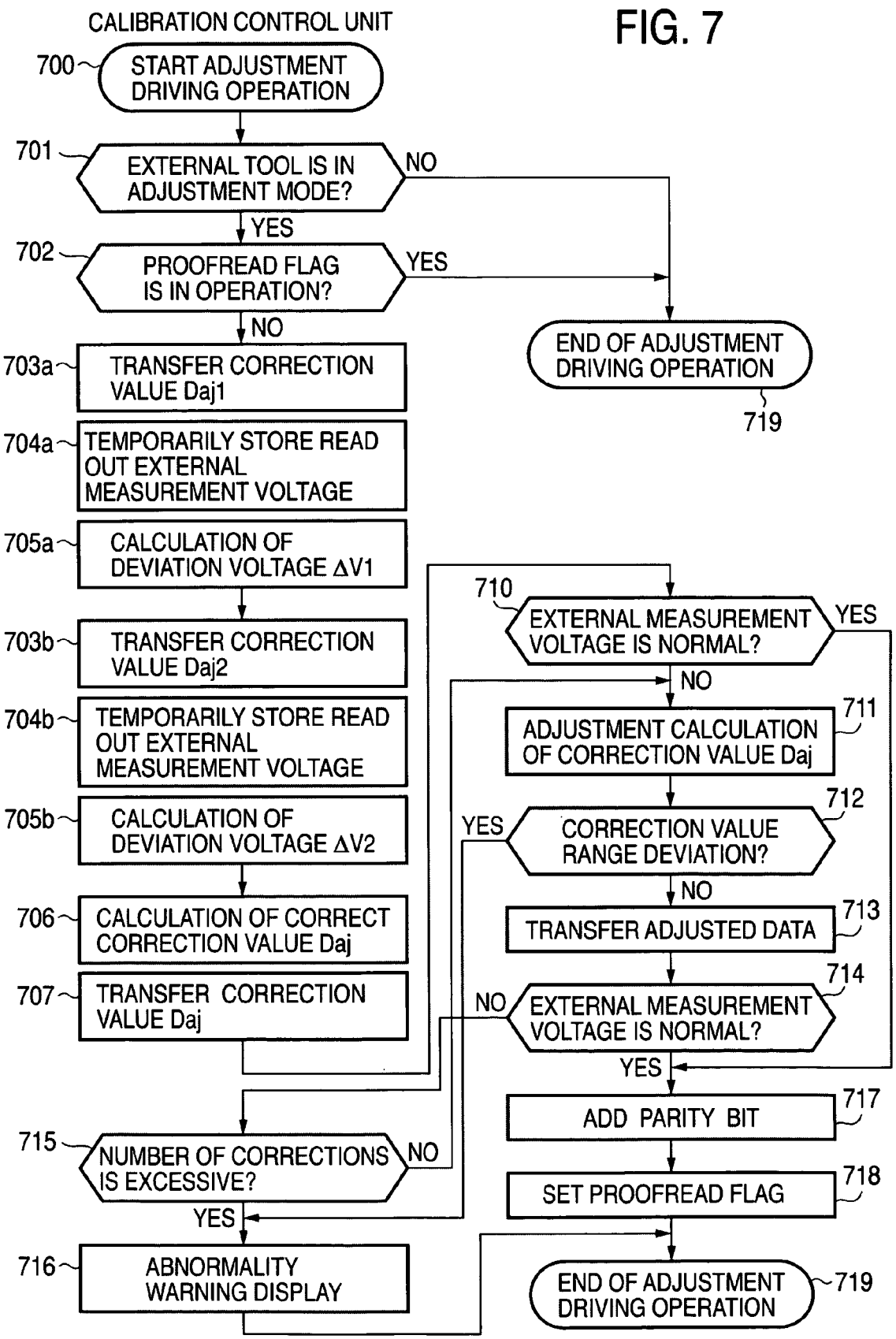
FIG. 7 is a flowchart showing an operation of adjustment driving operation of the device of FIG. 5.
Figure 8:
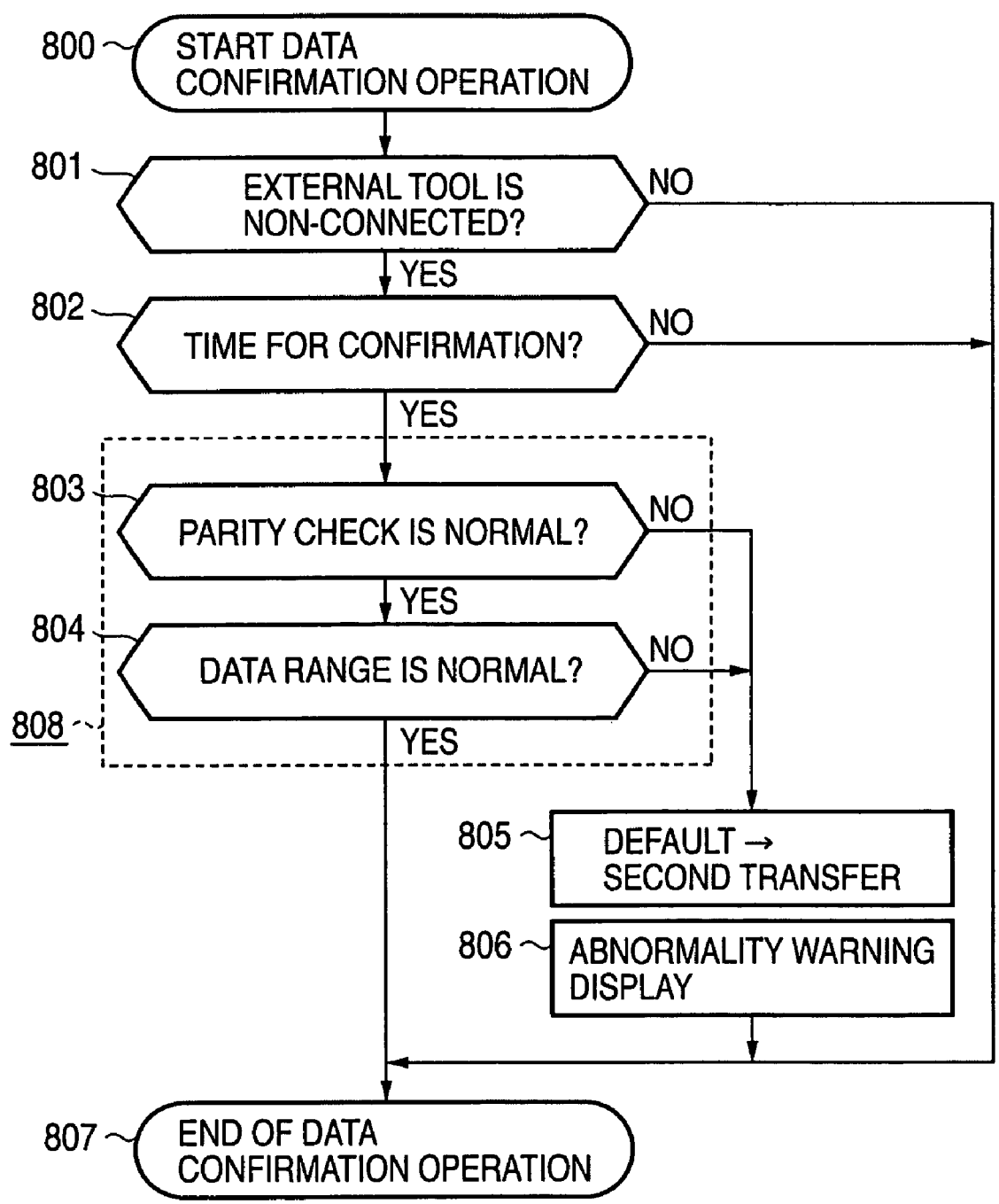
FIG. 8 is a flowchart showing an operation of data confirmation of the device of FIG. 5.

Note that, in this embodiment, various programs described later with reference to FIGS. 7 and 8 are stored in the auxiliary program memory 150, and the auxiliary microprocessor SCPU executes a proofread control of FIG. 7 and a data confirming control of FIG. 8 in place of the microprocessor 110b.

The communication control circuit 140b transfers the output voltage correction data sent from the microprocessor 110b to the second data memory 134b to write the output voltage correction data in the second data memory 134b, sends the on/off information of the on/off sensor unit 103b to the microprocessor 110b, and controls on/off of the electric load unit 105b using an output control signal from the microprocessor 110b.

Input interface circuits 113a, 113b, an analog interface circuit 114, output interface circuits 115a, 115b, and a serial interface 117 have similar constitution as those of FIG. 1 and are connected between the on/off sensor units 103a, 103b, the analog sensor unit 104, the electric load units 105a, 105b, and the external tool 107b and the microprocessor 110a or the communication control circuit 140b.

Hereinafter, description will be given with reference to FIG. 6 which is a block diagram of a component inspection unit shown in FIG. 5.

Figure 6:
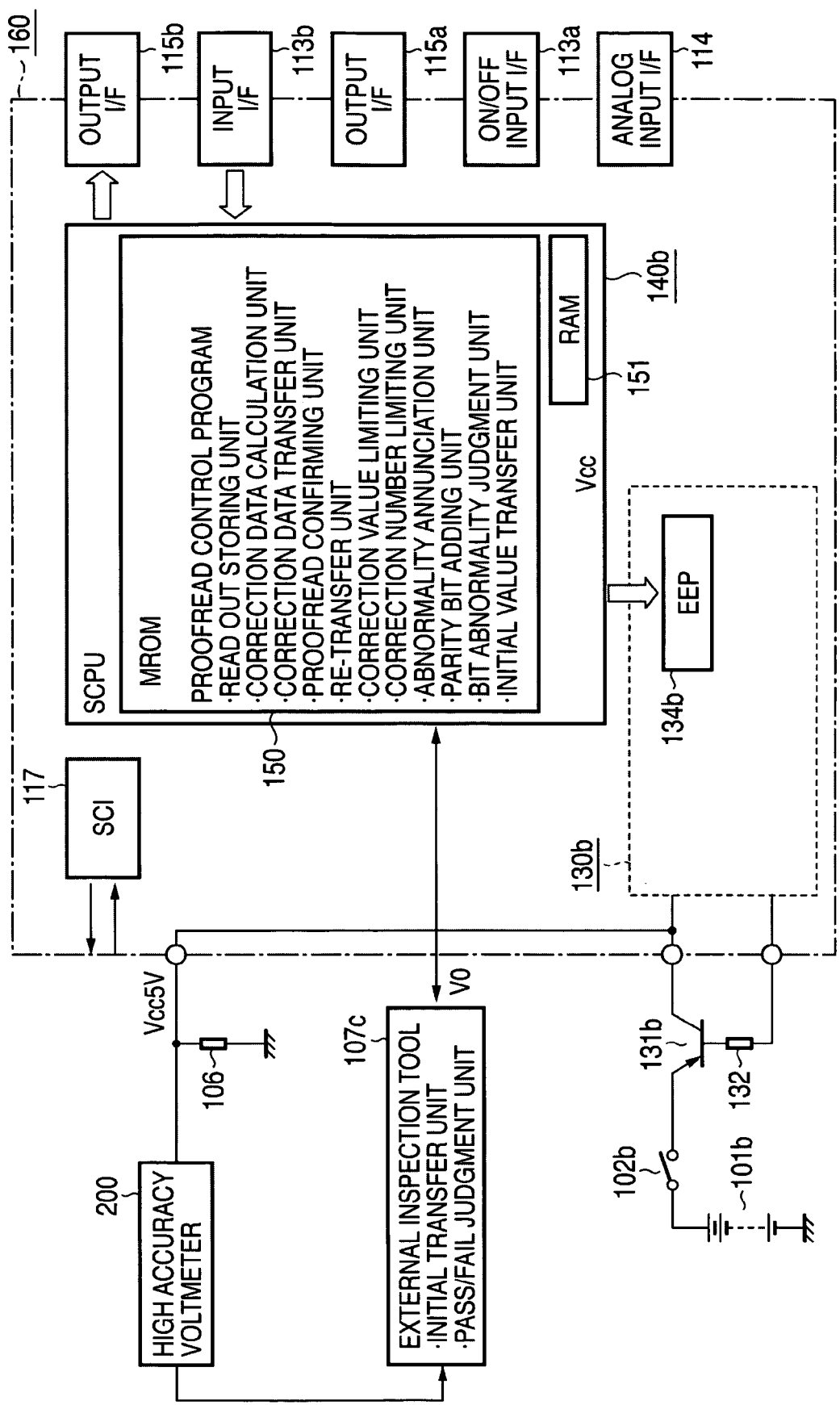
FIG. 6 is a block diagram showing a component inspection of the device of FIG. 5.

Referring to FIG. 6, a combined control circuit 160 is an integrated circuit element constituted mainly of the communication control circuit 140b and the output voltage adjustment circuit 130b and includes the small size circuit components (except for the heat generating components such as the large size resistance, the power transistor, and the like and the large size condenser) among the input interface circuits 113a, 113b, the analog interface circuit 114, and the output interface circuits 115a, 115b and the serial interface 117.

A substitute power transistor 131b having the base resistor 132 is connected at a position corresponding to the power transistor 131a, and then the current is feed from the external power source 101b corresponding to the in-vehicle battery 101a via the power switch 102b.

A substitute load circuit 106 is a load resistance used for supplying a current equivalent to an average load current of the power transistor 131a in the in-vehicle control device 100b to a substitute power transistor 131b.

A high accuracy voltmeter 200 measures an output voltage of the substitute power transistor 131b to send the measured output voltage to an external inspection tool 107c.

The control in the component inspection stage is mainly performed by the external inspection tool 107c, and the external inspection tool 107c sends a default value to the second data memory 134b via the communication control circuit 140b upon close of the power switch 102b to perform a pass/fail judgment by checking whether or not a measurement voltage of the high accuracy voltmeter 200 at the time of default value sending is in a predetermined fluctuation range.

Also, as the pass/fail judgment, it is possible to add a function of changing the output voltage correction data to be sent to the second data memory 134b to a minimum value and a maximum value and inspecting whether or not the measurement voltage of the high accuracy voltmeter 200 at the time of sending the output voltage correction data is in the predetermined adjustment band.

The combined control circuit 160 to which the predetermined default value is written in the component inspection stage is incorporated into the in-vehicle electronic control device 100b, so that the proofread processing shown in FIG. 7 is performed in a state where the in-vehicle electronic control device 100b is connected to the power transistor 131a and various actual loads and that the data confirmation shown in FIG. 8 is performed as required during operation of the in-vehicle electronic control device 100b.

(2) Detailed Description of Effect and Operation of Second Embodiment

Hereinafter, description will be given with reference to FIG. 7 which is a flowchart of a proofread control operation of the device having the constitution of FIG. 5.

Note that, in advance of an adjustment driving, various programs are transferred from the external tool 107b to the program memory 120b by a boot program (not shown) working in cooperation with the microprocessor 10b and that the programs thus-transferred to the program memory 120b are a communication control program, an input/output control program, control constant data, and the like, which are control programs and control constants unique to the in-vehicle electronic control device 100b. Also, a proofread control program and a data confirmation program shown in FIGS. 7 and 8 have been stored in the auxiliary program memory 150.

Referring to FIG. 7, in Step 700, the auxiliary microprocessor SCPU starts an adjustment driving operation upon power supply to the in-vehicle electronic control device 100b. In following Step 701, the external tool 107b is connected to judge whether or not an adjustment mode has been set, and the process proceeds an operation termination step 719 when the mode set in Step 701 is not the adjustment mode or to Step 702 when the mode set in Step 701 is the adjustment mode.

In Step 702, it is judged whether or not a proofread flag is set in Step 718 to proceed to the operation termination step 719 in the case where the proofread flag has been operated or to Step 703a when the proofread flag has not been operated.

In step 703a, a correction value Daj1, i.e. first output voltage correction data, is transferred to the second data memory 134b. In following Step 704a, an external measurement voltage V01 which is a measurement value of the high accuracy voltmeter 200 based on the correction value Daj1 is read out and temporarily stored in the RAM memory 151. In following Step 705a, a deviation voltage $\Delta V1=V01-5$ between the external measurement voltage V01 and a target output voltage of a constant voltage power source circuit of 5 V, for example, is calculated.

In Step 703b, which is a transfer step performed subsequently to Step 705a, a correction value Daj2, i.e. second output voltage correction data, is transferred to the second data memory 134b. In following Step 704b, an external measurement voltage V02 which is a measurement value of the high accuracy voltmeter 200 based on the correction value Daj2 is read out to be temporarily stored in the RAM memory 151. In following Step 705b, a deviation voltage $\Delta V2=V02-5$ between the external measurement voltage V02 and a target output voltage of the constant voltage power source circuit of 5 V, for example, is calculated.

In Step 706 performed subsequently to Step 705b, a correction value Daj which is output voltage correction data obtained when the deviation voltage is 0 is calculated by interpolation using the deviation voltages $\Delta V1$ and $\Delta V2$ corresponding to the first and second correction values Daj1 and Daj2. In following Step 707, the thus-calculated correction value Daj is written in the second data memory 134b to update the second data memory 134b.

In Step 710, which is a judgment step performed subsequently to Step 707, the deviation voltage $\Delta V$ between the external measurement voltage V0 measured by the high accuracy voltmeter 200 and the true target value of the constant voltage output Vcc of DC 5 V, for example, is a normal value equal to or lower than the predetermined threshold value, and the process proceeds to Step 717 when the deviation voltage $\Delta V$ is the normal value or to Step 711 when the deviation voltage $\Delta V$ is not normal.

In Step 711, an adjustment calculation is performed in order to adjust the correction value Daj which is the output voltage correction data in accordance with the deviation voltage $\Delta V=(V0-5)$.

In the adjustment calculation of Step 711, interpolation is performed by referring to the deviation voltage $\Delta V$ based on the correction value Daj obtained by Step 707 and the deviation voltage $\Delta V1$ or $\Delta V2$ to obtain a correction value of higher accuracy by the interpolation based on the data which are more approximate to the target value.

In Step 712, which is a judgment step performed subsequently to Step 711, it is judged whether or not the correction value Daj calculated in Step 711 deviates from an appropriate range of 2 to 61, for example, and the process proceed to Step 716 when the there is a deviation or to Step 713 when there is no deviation. In Step 712, a circuit constant is so set as to avoid the deviation of the correction value Daj from the range of 2 to 61 unless there is a product abnormality.

In Step 713, the adjustment value of the correction value Daj calculated in Step 711 is transferred to the second data memory 134b. In following Step 714, which is a judgment step, it is judged whether or not the deviation voltage between the external measurement voltage V10 based on the adjustment value of the correction value Daj transferred in Step 713 and the true target value of the constant voltage output Vcc of DC 5 V, for example, is a normal value equal to or lower than the predetermined threshold value, and the process proceeds to Step 717 when the deviation voltage is the normal value or to Step 715 when the deviation voltage $\Delta V$ is not normal.

In Step 717, which is a judgment step, it is judged whether or not the number of corrections in Step 711 has exceeded a predetermined value, and the process returns to Step 711 when the number does not exceed the predetermined value or to Step 716 when the number exceeds the predetermined value. In Step 716, an abnormality warning/display instruction is sent to the external tool 107b, and then the process proceeds to the operation termination step 719.

Step 717 is performed when the judgments of Steps 710 and 714 are YES and the deviation voltage between the external measurement voltage and the true target value of the constant voltage output Vcc of DC 5 V, for example, is the normal value equal to or lower than the predetermined threshold value, and a parity bit is added to the output voltage correction data transferred ultimately to the second data memory 134b to store the output voltage correction data in the second data memory 134b.

In Step 718 performed subsequently to Step 717, a proofread flag is set to store that the operation is in a proofread completion state. In the operation termination step 719, execution standby of other control operations of other control programs of the auxiliary microprocessor SCPU are performed, and then the operation start step 700 is activated again so that the subsequent steps are performed repeatedly.

To summarize the operation flow of the above-described adjustment driving: Steps 704a and 704b are external measurement voltage reading out and storing steps; Step 706 is a correction data calculation step; Step 707 is a correction data transfer step; Steps 710 and 714 are proofread confirming steps; Step 712 is a correction value limiting step; Step 713 is a re-transfer step, Step 715 is a correction number limiting step; Step 716 is an abnormality annunciation step; and Step 717 is a parity bit adding step.

Hereinafter, description will be given with reference to FIG. 8 which is a flowchart of a driving operation in the in-vehicle electronic control device 100*b* of FIG. 5.

Note that various programs are sent from the external tool 107*b* to the program memory 120*a* and connections to the external inspection tool 107*c* and the external tool 107*b* are cut off after performing the adjustment driving of FIG. 7 or the adjustment driving mode is released or changed to a monitor mode by the use of a keyboard in the external tool 107*b* in advance of the driving operation.

Referring to FIG. 8, the auxiliary microprocessor SCPU starts a data confirming operation upon close of the power switch 102*a* to check whether or not the output voltage correction data stored in the second data memory 134*b* is normal in Step 800. In following Step 801, which is a judgment step, it is judged whether or not the external tool 107*b* is connected or whether not the external tool 107*b* is in the monitor mode when the external tool 107*b* is connected, and the process proceeds to an operation termination step 807 when the external tool 107*b* is connected and is not in the monitor mode or to Step 802 when the external tool 107*b* is not connected or is connected and in the monitor mode.

In Step 802, which is a judgment step, it is judged whether or not it is data confirmation timing, and the process proceeds to the operation termination step 807 when it is not the data confirmation timing or to Step 803 when it is the data confirmation timing.

Note that the judgment of YES in the confirmation timing judgment in Step 802 is established when the operation is the first time operation performed immediately after the close of the power switch 102*a*, when a predetermined time has passed after the close of the power switch 102*a* and the engine revolution speed is in an idling revolution state, or when the engine is stopped due to the close of the power switch and a temporary power supply is performed by a delay interference circuit for the in-vehicle electronic control device 10*b*, and the timing is limited for the purpose of reducing control burden share of the auxiliary microprocessor SCPU in operation.

In Step 803, which is a judgment step, a parity check of the output voltage correction data stored in the second data memory 134*b* is performed based on the parity bit added to the second data memory 134*b* in Step 717 of FIG. 7, and the process proceeds to Step 805 when an abnormality is detected by the parity check or to Step 804 when there is no abnormality.

In step 804, which is a judgment step, it is judged whether or not a value of the output voltage correction data stored in the second data memory 134*b* is in a normal range of 2 to 61, and the process proceeds to Step 805 when the value is out of the normal range or to Step 807 when the value is in the normal range.

In step 805, which is an annunciation step, a predetermined default value of 30, for example, is written in the second data memory 134*b*. In following Step 806, an abnormality annunciation signal is generated for a warning display unit (not shown) to inform the operator.

In the operation termination step 807 performed subsequently to Steps 805 and 806, the auxiliary microprocessor SCPU performs execution standby of other control operations, and then the operation start step 800 is activated so that the subsequent steps are performed repeatedly.

To summarize the operation flow of the above described data confirmation: Step 803 is a parity abnormality judgment step; Step 804 is a range abnormality judgment step; Step 805 is an initial value transfer step; and Step 808 is a bit abnormality judgment step consisting of Steps 803 and 804.

Note that the proofread control and the data confirmation may be performed by the microprocessor 110*b* by transferring the various programs in the auxiliary program memory 150 shown in FIG. 6 to the program memory 120*b*.

Also, the data confirmation step shown in FIG. 4 and the data confirmation step shown in FIG. 8 may be committed so that the backup data of the second data memory is re-transferred to the first data memory with the contents of the second data memory being kept as they are when the contents of the second data memory do not coincide with the backup data stored in the first data memory and it is judged that the contents of the first data memory are abnormal and the contents of the second data memory are normal.

(3) Description of Constitution and Characteristics of Second Embodiment

The in-vehicle electronic control device 100*b* according to the second embodiment of this invention is provided with the microprocessor 110*b* having the nonvolatile program memory 120*b* in which the control program and the control constant transferred and written via the external tool 107*b* are stored, the first data memory 122*b* in which the learned data are stored, and the arithmetic processing RAM memory 121, and the in-vehicle control device 100*b* is further provided with the constant power source circuit, the output voltage adjustment circuit 130*b*, and the multi-channel AD converter 124. The program memory 120*b* includes programs operated as the external measurement voltage reading out and storing unit, the correction data calculating and transfer unit, and the proofread confirming unit.

The constant voltage power source circuit generates the predetermined constant voltage output Vcc using power controlled and supplied thereto by the in-vehicle battery 101*a* via the power transistor 131*a* and supplies power to at least the microprocessor 110*b*, the multi-channel AD converter 124, and the analog sensor unit 104 connected to the multi-channel AD converter 124.

The output voltage adjustment circuit 130*b* is provided with the reference voltage generation circuit 135 for generating the reference voltage Vs, the comparison amplification circuit 137 for comparing the sizes of the voltage proportional to the output voltage of the power transistor 131*a* and the reference voltage Vs, the resistance circuit network 136*b* which is added to the inverting input of the comparison amplification circuit 137 for performing fine adjustments of the comparison input voltages, and the nonvolatile second data memory 134*b* for selecting any of the on/off elements used for changing the synthetic resistance value of the resistance circuit network 136*a* and producing electric continuity of the selected on/off element. The electric continuity state of the power transistor 131*a* is controlled by the output from the comparison amplification circuit 137, and the output voltage becomes the predetermined constant voltage output Vcc proportional to the reference voltage Vs thanks to the negative feedback control.

The output voltage adjustment circuit 130*b* is formed as an integrated circuit including at least the communication control circuit 140*b*.

The communication control circuit 140b is connected to the microprocessor 110b via a serial communication circuit and serves to transfer data from the external inspection tool 107c to the second data memory 134b in the output voltage adjustment circuit 130b via the serial communication circuit.

The external inspection tool 107c is provided with a substitute power transistor 131b equivalent to the power transistor 131a which is used in combination with the output voltage adjustment circuit 130b, the substitute load circuit 106 to which power is supplied from the substitute power transistor 131b, and the high accuracy voltmeter 200 for measuring an output voltage of the substitute power transistor 131b. The external inspection tool 107c is provided with an initial transfer unit for transferring the predetermined default value at least to the second data memory 134b and a pass/fail judgment unit for confirming that the measurement value which is obtained by the high accuracy voltmeter 200 and in accordance with the default value is in the predetermined voltage range.

Therefore, the output voltage adjustment circuit 130b and the microprocessor 110b are readily connected to the external inspection tool, and it is possible to perform pass/fail judgments of component parts by the use of the simple external inspection tool.

The correction data calculating unit 706 calculates the deviation voltages $\Delta V1$, $\Delta V2$ between the external measurement voltages V01, V02 read out and stored by the external measurement voltage reading out and storing units 704a, 704b and the target output voltage values when the first and second output voltage correction data Daj1, Daj2 are transferred to the second data memory 134b and performs interpolation from the deviation voltages $\Delta V1$, $\Delta V2$ which are in accordance with the correction data Daj1, Daj2 to obtain the output voltage correction data Daj with which a value of the deviation voltage becomes 0.

Therefore, it is possible to obtain the correct output voltage correction data in the simple manner by the use of the simple calculation unit.

The output voltage adjustment circuit 130b is formed as the integrated circuit including at least the communication control circuit 140b, and the communication control circuit 140b further includes the auxiliary program memory 150 and the auxiliary RAM memory 151 working in cooperation with the auxiliary microprocessor SCPU.

A part of or whole of programs serving as the external measurement voltage reading out and storing unit, the proofread confirming unit, the correction data calculating and transfer unit, the re-transfer unit, the correction value limiting unit, the correction number limiting unit, the abnormality annunciation unit, the backup data storing unit, and the first and second transfer units is stored in the auxiliary program memory 150, and these programs are executed by the auxiliary microprocessor SCPU in place of the microprocessor 110b.

Therefore, it is possible to reduce the control burden share of the microprocessor and to make the communication with the external inspection tool in the component inspection stage easy.

The auxiliary program memory 150 is further provided with a parity bit adding unit 717, the bit abnormality judgment unit 808, and the initial value transfer unit 805.

The parity bit adding unit 717 adds a parity bit to the output voltage correction data to be transferred to the second data memory 134b in the adjustment driving stage to write-store the output voltage correction data in the second data memory 134b.

The bit abnormality judgment unit 808 serves as at least one of a unit for judging whether or not there is an abnormality in the parity check on the second data memory 134b and a unit for judging whether or not the value of the output voltage correction data stored in the second data memory 134b deviates from the predetermined band threshold value.

The initial value transfer unit 805 is used for transferring the predetermined default value to the second data memory 134b when the bit abnormality judgment unit 808 judges that there is an abnormality. The bit abnormality judgment unit 808 and the initial value transfer unit 805 are used immediately after the power input, before the power interference, or at an appropriate timing during driving in a practical driving stage of the in-vehicle electronic control device 100b.

The integrated circuit including the communication control circuit 140b and the output voltage adjustment circuit 130b further forms the combined control circuit 160 including a function of sending/receiving input/output information for a part of input/output signals of the microprocessor 110b and the input/output interface circuits 113b, 115b and performs control on the in-vehicle electric loads 105a, 105b by working in cooperation with the microprocessor 110b.

Therefore, it is possible to realize package downsizing thanks to the reduction in number of input/output terminals of the high speed, large capacity, and expensive microprocessor.

What is claimed is:

1. An in-vehicle electronic control device comprising:

a microprocessor comprising a nonvolatile program memory storing a control program, wherein the control program is transferred to the nonvolatile program memory via an external tool, a first nonvolatile data memory in which learned data are stored, an arithmetic processing RAM memory, and a multi-channel AD converter;

a constant voltage power source circuit comprising a power transistor; and an output voltage adjustment circuit comprising a nonvolatile second data memory, wherein the control program in the nonvolatile program memory operates as an external measurement voltage reading out and storing unit, a correction data calculating and transferring unit, and a proofread confirming unit, wherein the constant voltage power source circuit generates a voltage output Vcc based on power supplied by an in-vehicle battery to the power transistor, wherein the voltage output Vcc is supplied as power to at least the microprocessor, the multi-channel AD converter, and an analog sensor unit connected to the multi-channel AD converter, wherein the output voltage adjustment circuit further comprises a reference voltage generation circuit generating a reference voltage Vs, a comparison amplification circuit which compares the voltage output Vcc and the reference voltage Vs, and a resistance circuit network comprising a plurality of on/off elements, wherein the resistance circuit network is added to at least one input of the comparison amplification circuit, wherein the multi-channel AD converter generates a digital output voltage of a predetermined resolving power when the voltage output Vcc is fed as an input voltage to the multi-channel AD converter, wherein the multi-channel AD converter further selectively outputs a digital conversion value for a multiple of analog input values, wherein the external measurement voltage reading out and storing unit measures the generated digital output voltage, as a measured voltage V0, using a voltmeter provided outside the in-vehicle electronic control device and transfers the measured voltage V0 to the arithmetic RAM memory via the external tool to temporarily store the measurement voltage in the arithmetic RAM memory, wherein the correction data calculating and transferring unit calculates, when a deviation voltage between the measured voltage V0 and a target value of the voltage output Vcc is above a predetermined threshold, output voltage correction data based on a value of the deviation voltage and transfers the calculated output voltage correction data to the nonvolatile second data memory, wherein the nonvolatile second data memory stores the calculated output voltage correction data upon receipt of the calculated output voltage correction data, wherein the proofread confirming unit reads out a second measurement voltage V10 based on another measurement of the voltage output Vcc after the calculated output voltage correction data is stored in the nonvolatile second data memory to confirm whether or not a deviation between the measurement voltage V0 and the target value of the voltage output Vcc is corrected to an allowable error range based on the stored output voltage correction data and the predetermined threshold, wherein the resistance circuit network performs fine adjustment of the voltage output Vcc in response to the nonvolatile second data memory selecting, based on the calculated output voltage correction data, one or more of the plurality of on/off elements and producing electric continuity of the selected one or more on/off element to change a synthetic resistance of the resistance circuit network such that an electric continuity state of the power transistor is controlled by an output from the comparison amplification circuit, wherein the electric continuity state of the power transistor is controlled in a negative feedback control of the power transistor to set an output voltage of the power transistor to the voltage output Vcc, wherein the output voltage is adjusted based on the calculated output voltage correction data, and the voltage output Vcc is proportional to the reference voltage Vs, wherein the external measurement voltage reading out and storing unit, the correction data calculating and transferring unit, and the proofread confirmation unit are used as a proofread control unit operated in an adjustment driving stage of the in-vehicle control device, wherein the proofread confirming unit further comprises a re-transfer unit, at least one of a correction value limiting unit or a correction number limiting unit, and an abnormality annunciation unit, the re-transfer unit operates when the deviation confirmed by the proofread confirming unit is above the predetermined threshold and calculates, for a second time, the output voltage correction data by calculating output voltage correction data in response to the deviation, and transfers the newly calculated output voltage correction data to the nonvolatile second data memory to rewrite the output voltage correction data in the nonvolatile second data memory, the correction value limiting unit stops operation of the proofread confirming unit when the correction value calculated by the correction data calculation unit or the correction value newly calculated by correction calculation deviates from a predetermined allowable range, and the correction number limiting unit stops operation of the proofread confirming unit when the deviation between the external measurement voltage V10 and the target output voltage is not corrected to an allowable error range despite a predetermined number of the correction calculations and updates/transfers by the re-transfer unit.

2. The in-vehicle electronic control device according to claim 1, wherein the voltmeter has an accuracy equal to or higher than a minimum unit of the output voltage of the power transistor adjustable by the nonvolatile second data memory, and the measured voltage V0 measured by the voltmeter is read out by the external measurement voltage reading out and storing unit as digital data via the external tool to be temporarily stored in the arithmetic RAM memory.

3. The in-vehicle electronic control device according to claim 1, wherein an adjustment range of output voltage adjustment of the resistance circuit network is at least set to an adjustment band exceeding a maximum fluctuation range of the output voltage of the power transistor based on an individual fluctuation in characteristic value of each circuit component included in the in-vehicle electronic device, and the adjustment band is limited such that the voltage output Vcc is within the maximum fluctuation range if the output correction data stored in the nonvolatile second data memory leads the adjusted band to exceed the maximum fluctuation range.

4. The in-vehicle electronic control device according to claim 1, wherein the output voltage adjustment circuit is an integrated circuit including at least a communication control circuit, wherein the communication control circuit is connected to the microprocessor via a serial communication circuit and transfers data from an external inspection tool to the nonvolatile second data memory in the output voltage adjustment circuit via the serial communication circuit in a component inspection stage of the output voltage adjustment circuit, and the external inspection tool comprises a substitute power transistor which is shared by the output voltage adjustment circuit and equivalent to the power transistor, a substitute load circuit to which power is supplied from the substitute power transistor, and the voltmeter which measures an output voltage of the substitute power transistor, an initial value transfer unit for transferring a predetermined default value to at least the nonvolatile second data memory and a pass/fail judgment unit for confirming whether or not the measured substitute voltage corresponding to the predetermined default value is in a predetermined voltage range.

5. The in-vehicle electronic control device according to claim 4, wherein the integrated circuit part including the communication control circuit and the output voltage adjustment circuit further forms a combined control circuit including a function of sending/receiving input/output information for at least a part of input/output signals of the microprocessor and input/output interface circuits to perform control on in-vehicle electric loads by working in cooperation with the microprocessor.

6. The in-vehicle electronic control device according to claim 1, wherein the correction data calculating unit calculates deviation voltages $\Delta V1$, $\Delta V2$ between measured voltages V01, V02 measured by the external measurement voltage reading out and storing units and the target value of the voltage output Vcc when first and second output voltage correction data Daj1, Daj2 are transferred to the nonvolatile second data memory, and performs interpolation using the deviation voltages $\Delta V1$, $\Delta V2$ which correspond to the first and second output voltage correction data Daj1, Daj2 to obtain output voltage correction data Daj with which a value of the deviation voltage becomes 0.

7. The in-vehicle electronic control device according to claim 1, wherein
the abnormality annunciation unit operates when the correction value limiting unit or the correction number limiting unit stops operation of the proofread confirming unit to display a proofread impossible state using the external tool.

8. The in-vehicle electronic control device according to claim 1, wherein
the output voltage adjustment circuit is formed as an integrated circuit part including at least a communication control circuit,
the communication control circuit farther includes an auxiliary microprocessor comprising an auxiliary program memory and an auxiliary RAM memory,
wherein at least a part of the control program operated as the external measurement voltage reading out and storing unit, the proofread confirming unit, and the correction data calculating and transfer unit is stored in the auxiliary program memory, wherein at least the part of the control program stored in the auxiliary program memory is executed by the auxiliary microprocessor instead of the microprocessor.

9. An in-vehicle electronic control device comprising:
a microprocessor comprising a nonvolatile program memory storing a control program, wherein the control program is transferred to the nonvolatile program memory via an external tool, a first nonvolatile data memory in which learned data are stored, an arithmetic processing RAM memory, and a multi-channel AD converter;
a constant voltage power source circuit comprising a power transistor; and
an output voltage adjustment circuit comprising a nonvolatile second data memory,
wherein the control program in the nonvolatile program memory operates as an external measurement voltage reading out and storing unit, a correction data calculating and transferring unit, and a proofread confirming unit,
wherein the constant voltage power source circuit generates a voltage output Vcc based on power supplied by an in-vehicle battery to the power transistor, wherein the voltage output Vcc is supplied as power to at least the microprocessor, the multi-channel AD converter, and an analog sensor unit connected to the multi-channel AD converter,
wherein the output voltage adjustment circuit further comprises a reference voltage generation circuit generating a reference voltage Vs, a comparison amplification circuit which compares the voltage output Vcc and the reference voltage Vs, and a resistance circuit network comprising a plurality of on/off elements, wherein the resistance circuit network is added to at least one input of the comparison amplification circuit,
wherein the multi-channel AD converter generates a digital output voltage of a predetermined resolving power when the voltage output Vcc is fed as an analog input voltage to the multi-channel AD converter, wherein the multi-channel AD converter further selectively outputs a digital conversion value for a multiple of analog input values,
wherein the external measurement voltage reading out and storing unit measures the generated digital output voltage, as a measured voltage V0, using a voltmeter provided outside the in-vehicle electronic control device and transfers the measured voltage V0 to the arithmetic RAM memory via the external tool to temporarily store the measurement voltage in the arithmetic RAM memory,
wherein the correction data calculating and transferring unit calculates, when a deviation voltage between the measured voltage V0 and a target value of the voltage output Vcc is above a predetermined threshold, output voltage correction data based on a value of the deviation voltage and transfers the calculated output voltage correction data to the nonvolatile second data memory, wherein the nonvolatile second data memory stores the calculated output voltage correction data upon receipt of the calculated output voltage correction data,
wherein the proofread confirming unit reads out a second measurement voltage V10 based on another measurement of the voltage output Vcc after the calculated output voltage correction data is stored in the nonvolatile second data memory to confirm whether or not a deviation between the measurement voltage V10 and the target value of the voltage output Vcc is corrected to an allowable error range based on the stored output voltage correction data and the predetermined threshold,
wherein the resistance circuit network performs fine adjustment of the voltage output Vcc in response to the nonvolatile second data memory selecting, based on the calculated output voltage correction data, one or more of the plurality of on/off elements and producing electric continuity of the selected one or more on/off element to change a synthetic resistance of the resistance circuit network such that an electric continuity state of the power transistor is controlled by an output from the comparison amplification circuit, wherein the electric continuity state of the power transistor is controlled in a negative feedback control of the power transistor to set an output voltage of the power transistor to the voltage output Vcc, wherein the output voltage is adjusted based on the calculated output voltage correction data, and the voltage output Vcc is proportional to the reference voltage Vs,
wherein the external measurement voltage reading out and storing unit, the correction data calculating and transferring unit, and the proofread confirmation unit are used as a proofread control unit operated in an adjustment driving stage of the in-vehicle control device,
wherein the nonvolatile program memory further comprises a backup data storage and first and second transfer units,
wherein the backup data storage writes the calculated output voltage correction data transferred to the second data memory in the nonvolatile first data memory as backup data in the adjustment driving stage,
wherein the first transfer unit transfers, when the output voltage correction data stored to the nonvolatile second data memory does not coincide with the backup data stored in the first data memory, the backup data to the nonvolatile second data memory when a bit proof result relating to the nonvolatile first data memory is normal and the backup data are in the allowable error range,
wherein the second transfer unit operates when the output voltage correction data stored in the second data memory does not coincides with the backup data stored in the first data memory to transfer the predetermined default value to the second data memory when the bit proof result relating to the first data memory is abnormal or the backup data are out of the allowable error range, wherein the first and the second transfer units are operated immediately after power input, before power interruption, or at an appropriate timing during operation in an actual driving stage of the in-vehicle electronic control device, and wherein the bit proof is a unit for judging whether or not there is mixing/lacking of bit information using a sum check, or an inverting proof check.

10. An in-vehicle electronic control device comprising:

a microprocessor comprising a nonvolatile program memory storing a control program, wherein the control program is transferred to the nonvolatile program memory via an external tool, a first nonvolatile data memory in which learned data are stored, an arithmetic processing RAM memory, and a multi-channel AD converter;

a constant voltage power source circuit comprising a power transistor; and an output voltage adjustment circuit comprising a nonvolatile second data memory, wherein the control program in the nonvolatile program memory operates as an external measurement voltage reading out and storing unit, a correction data calculating and transferring unit, and a proofread confirming unit, wherein the constant voltage power source circuit generates a voltage output Vcc based on power supplied by an in-vehicle battery to the power transistor, wherein the voltage output Vcc is supplied as power to at least the microprocessor, the multi-channel AD converter, and an analog sensor unit connected to the multi-channel AD converter, wherein the output voltage adjustment circuit further comprises a reference voltage generation circuit generating a reference voltage Vs, a comparison amplification circuit which compares the voltage output Vcc and the reference voltage Vs, and a resistance circuit network comprising a plurality of on/off elements, wherein the resistance circuit network is added to at least one input of the comparison amplification circuit, wherein the multi-channel AD converter generates a digital output voltage of a predetermined resolving power when the voltage output Vcc is fed as an analog input voltage to the multi-channel AD converter, wherein the multi-channel AD converter further selectively outputs a digital conversion value for a multiple of analog input values, wherein the external measurement voltage reading out and storing unit measures the generated digital output voltage, as a measured voltage V0, using a voltmeter provided outside the in-vehicle electronic control device and transfers the measured voltage V0 to the arithmetic RAM memory via the external tool to temporarily store the measurement voltage in the arithmetic RAM memory, wherein the correction data calculating and transferring unit calculates, when a deviation voltage between the measured voltage V0 and a target value of the voltage output Vcc is above a predetermined threshold, output voltage correction data based on a value of the deviation voltage and transfers the calculated output voltage correction data to the nonvolatile second data memory, wherein the nonvolatile second data memory stores the calculated output voltage correction data upon receipt of the calculated output voltage correction data, wherein the proofread confirming unit reads out a second measurement voltage V10 based on another measurement of the voltage output Vcc after the calculated output voltage correction data is stored in the nonvolatile second data memory to confirm whether or not a deviation between the measurement voltage V10 and the target value of the voltage output Vcc is corrected to an allowable error range based on the stored output voltage correction data and the predetermined threshold, wherein the resistance circuit network performs fine adjustment of the voltage output Vcc in response to the nonvolatile second data memory selecting, based on the calculated output voltage correction data, one or more of the plurality of on/off elements and producing electric continuity of the selected one or more on/off element to change a synthetic resistance of the resistance circuit network such that an electric continuity state of the power transistor is controlled by an output from the comparison amplification circuit, wherein the electric continuity state of the power transistor is controlled in a negative feedback control of the power transistor to set an output voltage of the power transistor to the voltage output Vcc, wherein the output voltage is adjusted based on the calculated output voltage correction data, and the voltage output Vcc is proportional to the reference voltage Vs, wherein the external measurement voltage reading out and storing unit, the correction data calculating and transferring unit, and the proofread confirmation unit are used as a proofread control unit operated in an adjustment driving stage of the in-vehicle control device, wherein the output voltage adjustment circuit is formed as an integrated circuit part including at least a communication control circuit, the communication control circuit farther includes an auxiliary microprocessor comprising an auxiliary program memory and an auxiliary RAM memory, wherein at least a part of the control program operated as the external measurement voltage reading out and storing unit, the proofread confirming unit, and the correction data calculating and transfer unit is stored in the auxiliary program memory, wherein at least the part of the control program stored in the auxiliary program memory is executed by the auxiliary microprocessor instead of the microprocessor, wherein the nonvolatile program memory or the auxiliary program memory further comprises a parity bit adding unit, a bit abnormality judgment unit, and an initial value transfer unit, the parity bit adding unit adds a parity bit to the calculated output voltage correction data to be transferred to the nonvolatile second data memory in the adjustment driving stage to store the output voltage correction data in the nonvolatile second data memory, the bit abnormality judgment unit judges whether or not there is an abnormality in a parity check on the nonvolatile second data memory and judges whether or not the value of the output voltage correction data stored in the nonvolatile second data memory deviates from a predetermined band threshold value, the initial value transfer unit operates when the bit abnormality judgment unit judges that there is an abnormality in the parity check, and the bit abnormality judgment unit and the initial value transfer unit are operated immediately after the power input, before the power interference, or at an appropriate timing during driving in a practical driving stage of the in-vehicle electronic control device.

* * * * *